United States Patent [19]

Thompson et al.

[11] Patent Number: 4,752,925

[45] Date of Patent: Jun. 21, 1988

[54] TWO-HOP COLLOCATED SATELLITE COMMUNICATIONS SYSTEM

[75] Inventors: James D. Thompson, Manhattan Beach; Harold A. Rosen, Santa Monica; Leeor Pressman, Venice, all of Calif.

[73] Assignee: Hughes Aircraft Company, Los Angeles, Calif.

[21] Appl. No.: 670,085

[22] Filed: Nov. 13, 1984

[51] Int. Cl.$^4$ .............................................. H04J 3/06
[52] U.S. Cl. ...................................... 370/104; 370/75
[58] Field of Search ................. 455/12; 370/50, 104, 370/75

[56] References Cited

U.S. PATENT DOCUMENTS 4,004,098 1/1977 Shimasaki ........................ 370/104

FOREIGN PATENT DOCUMENTS 0186236 10/1983 Japan ...................................... 370/50

Primary Examiner—Douglas W. Olms
Assistant Examiner—Kenneth I. Rokoff
Attorney, Agent, or Firm—Steven M. Mitchell; Mark J. Meltzer; A. W. Karambelas

[57] ABSTRACT

A two-hop communications system utilizing two collocated spacecraft (Se and Sw) and two remote intersatellite exchange (RISE) means (Re and Rw) provides for communications between ground stations located in two or more defined subregions. Each satellite includes wide band transponders for relaying ground station transmissions to the RISEs. The RISEs convert first hop frequency division multiplexed (FDM) signals to time division multiplexed (TDM) for the second hop. Signals are coded by frequency, polarization and direction so as to avoid loss of bandwidth due to the two-hop approach.

21 Claims, 6 Drawing Sheets

TWO-HOP COLLOCATED SATELLITE COMMUNICATIONS SYSTEM

BACKGROUND OF THE INVENTION

The present invention relates to a satellite communications system, and, more particularly, to such a system providing communication among many ground station terminals.

One way to allow a greater number ot people to enjoy the benefits of space technology is to provide a system which permits communication among a large number of inexpensive terminals. Such a trend occurred in the transition from telegraph to telephone. Businessmen once traveled to telegraph stations and relied on specially trained operators to convey messages destined for out of town. Today, much communication is effected from the office using a simple and affordable terminal, namely, the telephone. However, document transfer, for example, has not progressed to such convenience.

Satellites promise to extend our communications capabilities. However, just as the mundane telephone belies a costly and complex system of interconnections, so a simple and economical customer premise terminal (CPT) demands a costly and complex satellite system.

The shift of cost and complexity from terminal to transmission system has far more impact when the latter includes a satellite. Additional complexity usually results in increased bulk and weight, which, in turn, affect launch costs. The effect is more than linear once the limits of most commercial launchers are exceeded.

The shift of complexity to a satellite renders impractical many needed repairs and renovations. The cost in downtime and money of replacing a damaged satellite, especially a complex one, reaches nightmare proportions.

Due to the investment required in a satellite, underutilization, insufficient capacity, and mismatch of satellite capability with traffic demands are very costly. Traffic patterns generally increase and shift over the lifetime of a satellite. However, providing for increasing capacity and changing traffic patterns in a spaceborne system presents unique challenges.

It is recognized that risk distribution and flexibility can be provided by a multiple satellite system. However, the number of "slots" in the geosynchronous orbit, the one most useful for communications satellites, is limited. Furthermore, the individual satellites of a multi-satellite system must involve added complexity to communicate with one another, or else the overall capacity of the system must be severely curtailed.

In order to shift some of the cost and complexity to more accessible ground stations, two-hop communications systems have been proposed. In such systems, signals from origination CPTs are directed by a first satellite to a central ground processing station. The processing station amplifies and/or otherwise reformats the signals and redirects the signals to a second satellite for transmission to destination CPTs.

Much of the cost and complexity of a two-hop system resides in the central ground processing station. This lowers the cost of the satellites and renders much of the system accessible for repairs and upgrades.

On the other hand, such proposed two-hop systems require multiple slots in geosynchronous orbit. The increasing competition for such slots renders such two-hop systems impractical. Also, since there are two satellites, the exposure of the system to satellite failure is doubled. Upon failure of a satellite, two-hop operation is lost, and the system is down or else one-hop communications must be resorted to.

What is needed is a satellite communications system which preserves the advantages of a two-hop system, while avoiding the requirement of multiple orbital slots. Furthermore, such a system should permit viable two-hop operation in the event of a satellite failure.

SUMMARY OF THE INVENTION

In accordance with the present invention, satellite communications systems are collocated in a single orbital slot and provide two-hop communications among a large number of CPTs in conjunction with remote inter-satellite exchange (RISE) stations. Collocating the satellite communications systems introduces additional problems which are addressed by the present invention.

"Collocated" characterizes orbital positions not distinguishable by the CPTs. The term is relative to the resolving power of the CPTs, but practically, collocated refers to an angular displacement of no more than 1° in the geosynchronous or other shared orbit. "Collocated" can characterize the positions of separate satellites, but also encompasses plural systems which are part of a single satellite.

In a collocated system, the satellite location variable available to multi-slot two-hop systems is lost, implying a potential bandwidth penalty of one-half for the collocated two-hop system. To ameliorate the bandwidth penalty, the present invention provides for the employment of RISE stations which are spatially isolated from CPTs sharing its polarization scheme.

"Spatial isolation", somewhat of an antonym of "collocated", refers to angular directions distinguishable by the satellite communications systems. Here, 1° is a practical minimum that applies to the angular displacement between a RISE and the nearest CPT sharing its polarization scheme from the perspective of the satellites. This arrangement takes full advantage of the available bandwidth despite the presence of intermediate links not connecting end-users. The spatially isolated RISEs can operate in conjunction with first-hop wideband transponders to provide economical two-hop communications with minimal loss of efficiency in comparison to a one-hop approach.

In addition, the operating frequencies and polarizations of the various transponders can be selected so that, where one of two satellites fail, there is minimal detriment to the end users. This is effected by having a common polarization scheme for each satellite.

Another problem addressed by the present system is the need to have the power flux density of the first-hop downlink near the intended RISE comparable to the power flux density of the second-hop downlink near the same RISE. The comparability insures that the destination downlink does not unacceptably interfere with reception at a RISE, and that the first-hop downlink does not interfere unacceptably with reception by the nearby CPTs. This comparability can be achieved using very narrow beam links with the RISEs.

In one realization of the invention, a RISE converts frequency division multiplexed (FDM) signals to time division multiplexed (TDM) signals. This permits the following two-hop mode of system operation. On the first hop, a CPT transmits a signal within a narrow frequency band, the band being selected from a range of frequencies. The satellite multiplexes signals received from many such CPTs and transmits the resulting FDM signal to the RISE, which converts the signal to TDM.

On the second hop, the TDM signal is transmitted to the collocated satellite communications means and thence to the destination CPTs. The overall system takes advantage of the relatively high power afforded to the small number of RISE stations to provide a strong TDM signal receivable by the relatively low sensitivity CPTs.

An advantageous realization of the present invention defines two zones of CPTs addressable by the system, assigning a RISE to each zone. Each RISE is located inside its respective zone, or, in any event, outside the nonrespective zone. More specifically, each RISE is spatially isolated from the nonrespective zone.

The present invention solves many of the problems addressed earlier in part by shifting much of the cost and complexity to one, two, or other small number of RISE stations. This saves launch fees, and grants much greater accessibility to repairs, improvements, and adjustments to changing traffic density and patterns.

By collocating communication means, "celestial real estate" is economized. Yet, redundancy and system flexibility is provided by plural collocated satellites. For example, the invention provides for a start-up phase in which one satellite is flown until consumer demand justifies the capacity afforded by the second satellite. Basically, in the present invention, the cost and complexity resides in a small number of operator accessible RISE stations, and not in the numerous CPTs or in inaccessible and bulk-sensitive satellites.

In accordance with the present invention, a collocated two-hop satellite communications system provides for communication among a large number of economical CPTs within a region. The invention is implemented so that the bandwidth efficiency of a one-hop system is approached, while providing for the redistribution of much of the cost and complexity of the system to accessible RISE stations. An assignment of the system bandwidth by spatial location, frequency and polarization is provided that permits a convenient one-satellite back-up mode. Economical wideband first-hop transponders and narrow beam links to the RISEs minimize interference between first-hop and second-hop downlink signals.

BRIEF DESCRIPTION OF THE DRAWINGS

FIG. 1b illustrates two first-hop uplinks to another satellite in the satellite communications system referred to in connection with FIG. 1a.

FIG. 2a illustrates two first-hop downlinks from the satellite of FIG. 1a.

FIG. 3a illustrates a second-hop uplink to the satellite of FIG. 1a.

FIG. 4a illustrates second-hop downlinks from the satellite of FIG. 1a.

FIG. 6 is a schematic of a repeater incorporated in the satellite illustrated in FIG. 1a.

DESCRIPTION OF THE PREFERRED EMBODIMENTS

Figure 1A:
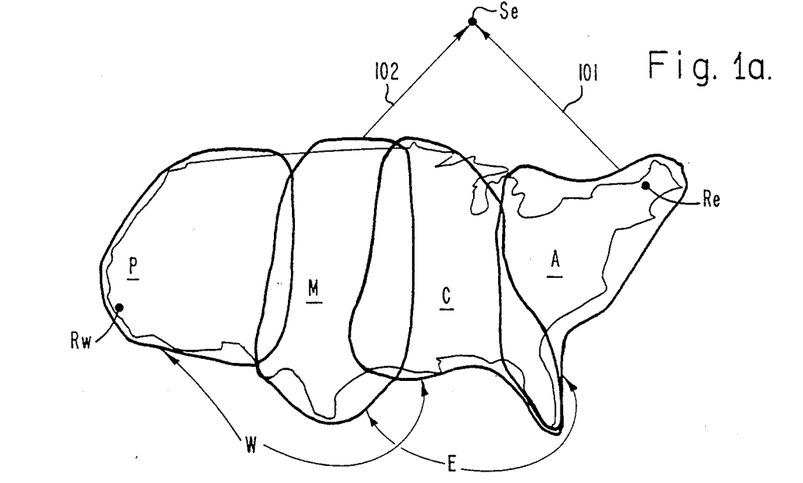
FIG. 1a illustrates two first-hop uplinks to a satellite in a satellite communications system in accordance with the present invention.
Figure 1B:
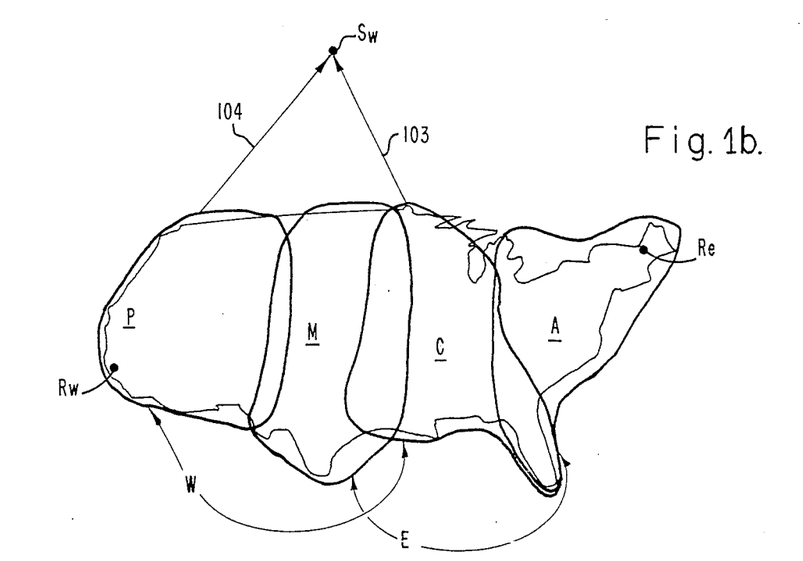
Figure 2A:
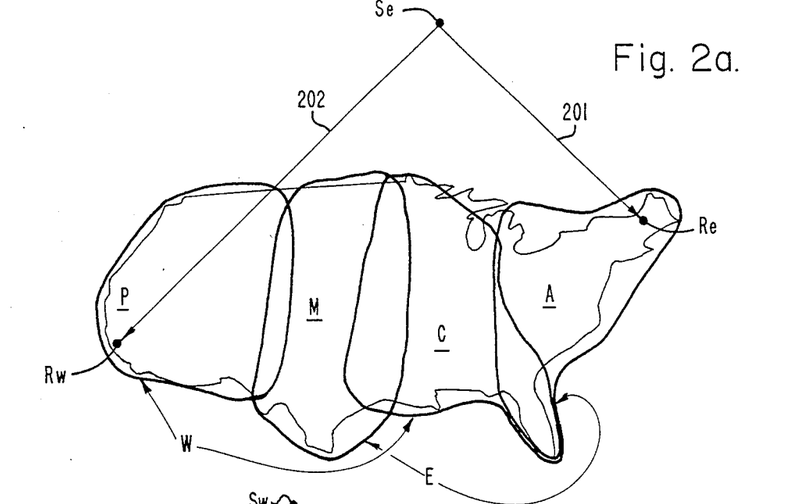
Figure 2B:
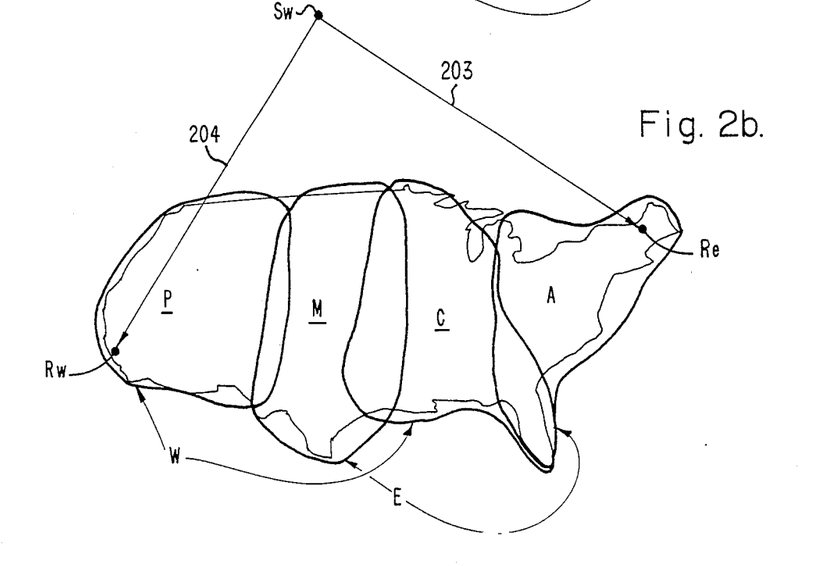
FIG. 2b illustrates two first-hop downlinks from the satellite of FIG. 1b.

A satellite communications system for interconnecting CPTs located in the contiguous United States (CONUS) includes two satellite communications means and remote inter-satellite exchange (RISE) means. The system provides for communications with the following links: origination CPT to satellite (FIGS. 1a and 1b); satellite to RISE (FIGS. 2a and 2b); RISE to satellite (FIGS. 3a and 3b); and satellite to destination CPT (FIGS. 4a and 4b). The system uses available frequency, polarization and spatial isolation to optimize communications capacity and flexibility.

When fully deployed, the communications system includes two essentially identical satellites, Se and Sw, collocated in the same orbital slot. "Collocated" means that the satellites' positions are not distinguishable by the CPTs and RISEs. In the present system, the collocated satellites are within $0.2°$, and in any event within $1°$, of each other in the geosynchronous orbit. The designations "eastern" and "western", when applied to the satellites, only refer to the primary zone served, and does not characterize the structure or location of the satellites.

The system defines an eastern zone E and a western zone W within CONUS. Each zone comprises two non-contiguous areas. The eastern zone E includes an Atlantic area A and a mountain area M. The western zone W includes a Pacific area P and a central area C.

A western RISE Rw is located in the Pacific area P, and is spatially isolated from the eastern zone E. An eastern RISE Re is located in the Atlantic area A, and is spatially isolated from the western zone W.

The present system is a two-hop system. By this is meant that a message undergoes two uplinks and two downlinks before arriving at its intended destination. One advantage of a two-hop system is that much of the bulk, cost, and complexity required of a system to support satellite communications between low power CPTs is located on the ground. Thus, critical system components are less vulnerable to the satellite risks and more accessible to system operators.

The present system also provides for the division of spaceborne capacity between two satellites to distribute satellite risks, allow two-step initialization of the system via separate launches, and to provide redundancy in case of satellite failure. The satellites are collocated to economize on scarce allocations of geosynchronous orbital slots. The two satellites cooperate, each sharing approximately one-half the traffic.

Combining collocation with a two-hop system can halve communications bandwidth. However, the present system overcomes this problem by using the spatial isolation of the RISEs and an appropriate distribution of transmitting frequencies and polarizations. In the illustrated embodiment, each satellite has a capacity of about 4,000 simultaneous CPT accesses. This is doubled to about 8,000 CPT accesses, with both satellites operational. A standard satellite architecture would require 8 to 10 more transponders to implement the first-hop FDM communications. The exact number is a function of detailed satellite design.

To access the system, a user transmits a signal from a CPT to the respective satellite. As illustrated in FIG. 1a, an origination CPT located in the Atlantic area A directs a transmission within a narrow band of an uplink frequency range along a beam 101 to the eastern satellite Se. Likewise, an origination CPT located in the mountain area M would transmit along a beam 102 to the same satellite. In other words, eastern satellite Se receives all origination uplinks from the eastern zone E.

To complement this, the western satellite Sw receives all origination uplinks from the western zone W. More specifically, a signal originating in the central area is transmitted along a beam 103 to the western satellite Sw, and a signal originating in the Pacific area P arrives at the same satellite along a beam 104.

Since the satellites are collocated, each has the potential of receiving from all CPTs. The satellites are equipped to distinguish signals according to polarization so that each satellite can eliminate signals from the opposing zone. All CPT transmissions from the eastern zone E are horizontally polarized and all CPT signals from the western zone W are vertically polarized.

Each satellite multiplexes the receptions from the corresponding zones and redirects the resulting FDM signals, within a downlink frequency range, to the RISEs. In the illustrated embodiment, the selection of RISEs depends on the frequency of the origination signal. Signals in the lower half of the uplink frequency range are shifted to the lower half of the frequency range and directed to the corresponding RISE, and signals in the upper half of the uplink frequency range are directed to the other RISE. Signals from either satellite to the eastern RISE Re are horizontally polarized and signals to the western RISE are vertically polarized.

In other words, a signal from an eastern CPT in the lower half of the uplink frequency range is redirected to the eastern RISE Re along beam 201 of FIG. 2a. This redirected signal is horizontally polarized and has a frequency in the lower half of the downlink frequency range. A signal from an eastern CPT in the upper half of the uplink frequency range is redirected to the western RISE Rw along beam 202. The signal along beam 202 is vertically polarized and has a frequency in the upper half of the downlink frequency range.

In complementary fashion, a signal in the upper half of the uplink frequency range from the western zone W is redirected to the eastern RISE Re along beam 203, shown in FIG. 2b. The signal along beam 203 is horizontally polarized and has a frequency in the upper half of the downlink frequency range. A signal in the lower half of the uplink frequency range from the western zone W is redirected to the western RISE Rw along beam 204; the signal along beam 204 is vertically polarized and is within the lower half of the downlink frequency range.

The RISEs demodulate the signals and reformat the information in a series of TDM signals which are then relayed back to the respective satellite for the second hop. The complexity of the system resides at the RISEs which perform the demod/remod function. The converted signals are directed to the corresponding satellites within the same uplink frequency range used by the CPTs.

Figure 3A:
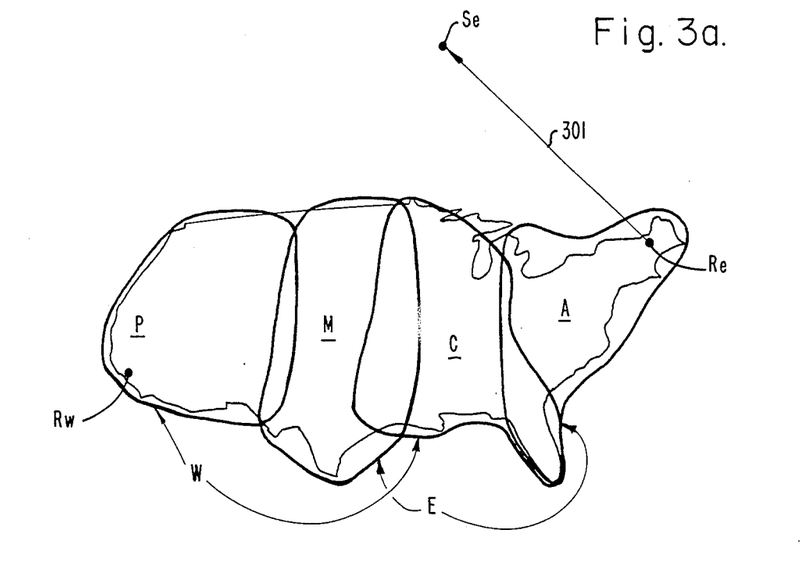
Figure 3B:
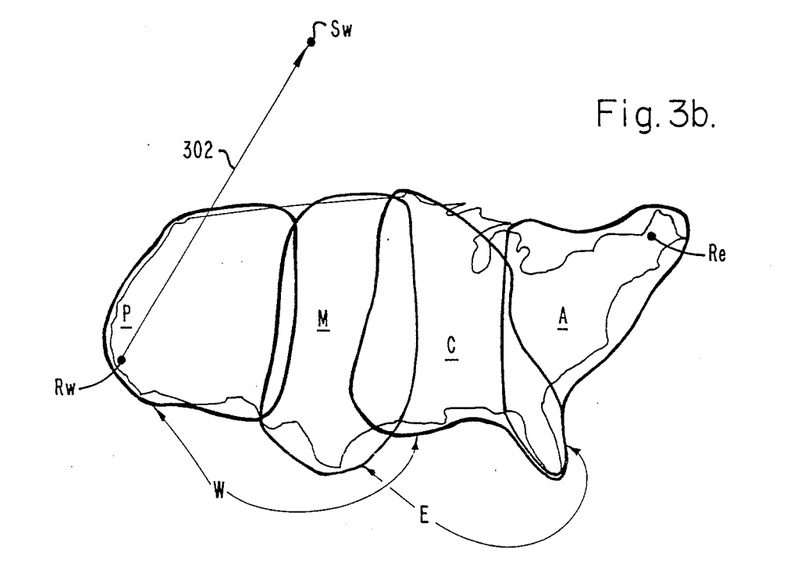
FIG. 3b illustrates a second-hop uplink to the satellite of FIG. 1b.
Figure 4A:
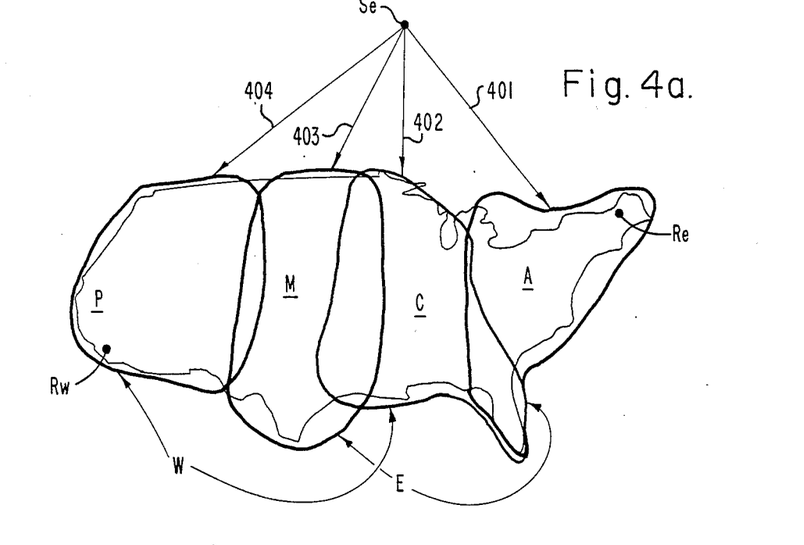
Figure 4B:
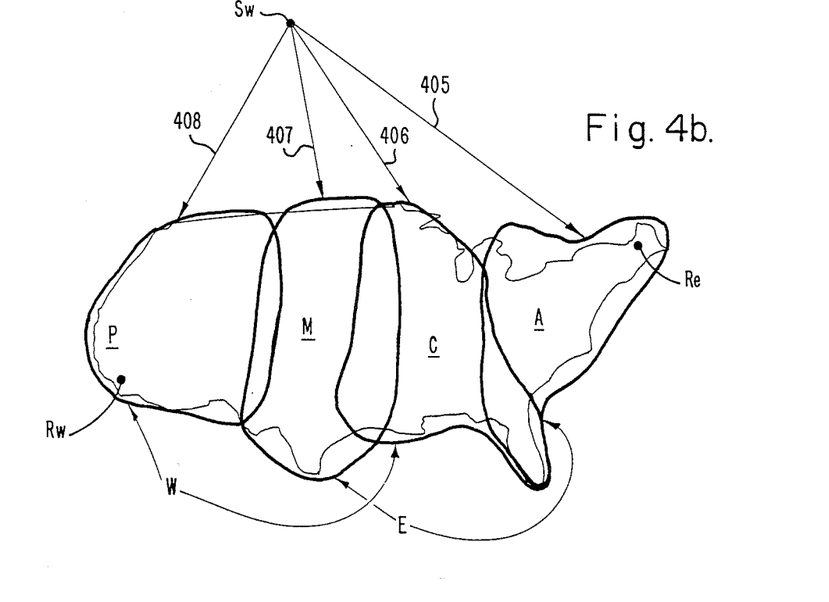
FIG. 4b illustrates second-hop downlinks from the satellite of FIG. 1b.

The TDM signal from the eastern RISE Re is directed along beam 301 as indicated in FIG. 3a; the signal along beam 301 is vertically polarized to minimize interference with the Atlantic area originating beam 101 of FIG. 1a. The TDM from the western RISE Rw is directed along beam 302 as indicated in FIG. 3b; the signal along beam 302 is horizontally polarized to minimize interference with Pacific originating beam 104 of FIG. 1b.

Each satellite reverses the polarization of every other frequency band within the range of frequencies on the second hop. Thus, each satellite transmits staggered vertically and horizontally polarized signals. The eastern satellite Se transmits the vertically polarized signals to the Atlantic area A along beam 401 and to the mountain area M along beam 403, as shown in FIG. 4a. The same satellite transmits horizontally polarized signals to the central area C along beam 402 and to the Pacific area along beam 404.

The western satellite Sw transmits vertically polarized signals to the Atlantic area A along beam 405 and to the mountain area M along beam 407. The same satellite transmits horizontally polarized signals to the central area C along beam 406 and to the Pacific area P along beam 408.

Frequency reuse is attained in the disclosed system since each RISE transmits at a polarization opposite to that of the surrounding origination CPTs, and each RISE receives at a polarization opposite that of surrounding destination CPTs. Thus, the bandwidth efficiency of a one-hop system is achieved along with the advantages of a two-hop system using collocated satellites. The operation of the system depicted in FIGS. 1a through 4b is summarized in FIG. 5.

This communications system can operate in a single satellite mode. This is important where there is, e.g., for economic reasons, an interval between the satellite launches. Also, the single satellite mode serves as a backup in case of a satellite failure or loss.

In its single satellite mode, each satellite can provide four beams for receiving and transmitting CPT signals and two beams for receiving and transmitting RISE signals. The first uplink (CPT to satellite) is achieved with four receive beams covering the Atlantic, central, mountain and Pacific areas. Moving from east to west, these beams alternately use horizontal and vertical polarization. The signals arriving on these four beams are summed together at a variable power combiner 603, FIG. 6, for transmission through the satellite. The satellite retransmits these signals to either the eastern RISE or the western RISE.

Only one RISE needs to be in operation in the single satellite plan. The satellite is capable of switching from the eastern to the western RISE beam in orbit. The RISE reformats the broadband spectrum of CPT signals into sixteen individual signals 22 MHz wide. These are transmitted to the satellite on a vertically polarized beam from the east or a horizontally polarized beam from the west. The uplink signal from the RISEs is orthogonally polarized to the CPT signals coming from the same geographic area of the country. Note that the disclosed frequency x polarization scheme permits the transition from one-satellite to two-satellite operation to occur without changing the polarizations of the CPTs.

The satellite receives the sixteen RISE uplink signals and retransmits them down to the CPTs. The odd channels are transmitted using horizontal polarization while the even channels are transmitted using vertical polarization.

For the second hop downlink, four beams are provided for transmit coverage over CONUS. The Pacific and central beams are horizontally polarized and share the use of the eight odd-numbered transponders. The Atlantic and mountain beams are vertically polarized and share the use of the even-numbered transponders.

For each beam pair, the eight transponders can be assigned to either beam based on traffic density requirements.

The Pacific and central beams use horizontal polarization while Atlantic and mountain beams use vertical polarization. The eight transponders on a satellite associated with the horizontally polarized beams may be shifted between the Pacific and central areas.

Likewise, the eight transponders associated with the vertically polarized beams may be shifted between the Atlantic and the mountain areas. This arrangement permits transponders to be concentrated in the eastern half of CONUS. In addition, the borders of the beams are selected so that 50% of the traffic would be accommodated by the horizontally polarized beams with the remaining 50% being accommodated by the vertically polarized beams.

The repeater 600 which enables the eastern satellite Se to perform as described above is illustrated in FIG. 6. The repeater for the western satellite Sw is substantially the same. Both repeaters provide for alternative modes of operation for added flexibility and redundancy.

The repeater 600 has eighteen transponders, including sixteen narrow band transponders and two wide band transponders. The transponders are identified in FIG. 6 as located at the bandpass filters 602 for the sixteen narrow band transponders and 604-U and 604-L for the two wide band transponders. The transponders have sufficient power to communicate with CPTs having one to two meter antennas. The repeater 600 is cylindrically configured so that the ends 617 are connected, as are the ends 619.

In the primary mode of operation, origination CPT uplink signals are received along beams 101 and 102 (FIG. 1a) at feeds 601. The received signals are combined to form an eastern first-hop uplink signal. This signal is amplified and frequency shifted at a receiver complex 605. The receiver complex 605 includes four receivers and rerouting switches 640 to provide four-for-two redundancy; only one receiver is required to handle the first-hop uplink signals.

Figure 6:
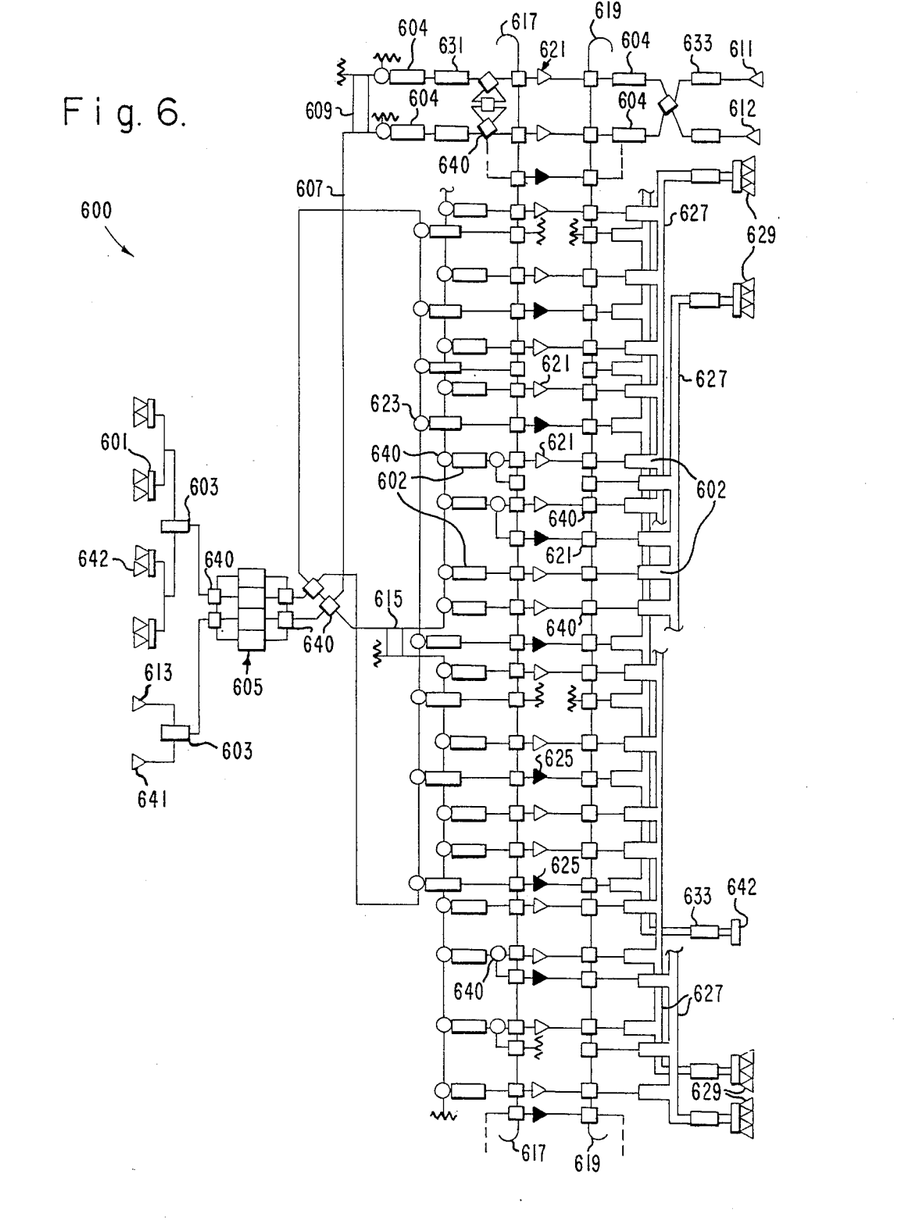

The received signal is directed along a transmission line 607 to a hybrid 609. The hybrid 609 divides the signal between two paths, one containing the upper bandpass filters 604-U, which together with the intermediate traveling wave tube amplifier (TWTA) 621, define the wideband transponder for the upper half of the frequency range for the first hop. This transponder forms the beam 201 which is directed from a feed 611 to the eastern RISE Re.

The other path includes the lower bandpass filters 604-L, which define the wideband transponder for the lower half of the frequency range for the first hop. This transponder forms a signal which is directed from feed 612 along beam 202 to the western RISE Rw. Variable attenuators 631 allow adjustment of transponder gain in orbit. Receiver rejection filters 633 suppress noise at receiver frequencies. The use of the wideband transponders 604-U and 604-L for the upper and lower frequency first hop downlink signals greatly simplifies the manufacture and operation of the satellites Se and Sw.

The TDM uplink along beam 301 from the eastern RISE Re is received by the receiver complex 605 via feed 613. From there, the signal is divided at a hybrid 615 and routed to the narrow band transponders.

The transponders for the primary operational mode are identifed by numbered filters 1-16 in conjunction with intermediate TWTAs 621 depicted as open triangles. Alternative paths including switches 623, and TWTAs 625, depicted as filled triangles, define transponders for alternative one-hop and mixed modes.

The signals in the narrow band transponder paths are routed through output manifolds 627 to area feeds 629 and along beams 401-4 to destination CPTs in respective areas A, C, M and P.

Numerous routing switches 640, depicted as squares and circles in FIG. 6, provide for redundancy and alternative modes of operation. Some of these modes use alternative feeds 641 and 642. More particularly, each satellite can receive CPT uplinks from all areas and both RISEs, and transmit a single regional beam over CONUS via feed 642. The alternative modes can combine in various ways, using variable power combiners 603.

The first downlink signals along beams 201 and 202 are limited by the power of the originating CPT and the satellite TWTAs 621, which must be operated in their relatively low power linear regions to handle the FDM signals. The second downlink signals have the advantage of the transmitting power of the RISEs and the fact that the associated TWTAs 621 can be operating in their high power region.

The very narrow first downlink beams formed by single feeds 611 and 612 compensate for the total power discrepancy between the first and second downlinks to achieve flux densities at the RISEs which are comparable, i.e. within an order of magnitude. This rough balance provides that each RISE and the nearby CPTs can receive their respective signals without undue interference by the nonrespective signals.

As is apparent from FIG. 6 and the related discussion, the disclosed system is capable of a variety of operating modes. The system can operate in one-hop, two-hop and mixed modes. The system can function with one, two or more satellites, and with neither, either or both RISEs. Also note that the repeater employs ample rerouting to maintain full operation by bypassing defective transponders. Up to eight of these transponders are individually switchable to CONUS coverage.

Twenty-seven TWTAs are provided for eighteen active transponders in a ring redundancy arrangement. The low band and high band transponders, associated with the first hop, have access to six of the TWTAs in the ring. With this arrangement, five TWTAs have to fail before the first hop of the double hop service is affected. The sixteen transponders associated with the second hop are protected by 50% TWTA sparing. The arrangement of the ring provides for a high degree of flexibility for sparing in the event of a TWTA failure.

Nominally, three of the eight odd-numbered transponders are assigned to the Pacific beam with the remaining five routed to the central beam. However, some additional multiplexer filters and switches have been provided to permit this 3/5 distribution to be changed to a 2/6 distribution or to a 4/4 distribution.

A similar arrangement is used with the even-numbered transponders. Nominally, two of these transponders would be routed to the mountain beam with the remaining six going to the east beam. However, this 2/6 distribution can be changed to a 1/7 or to a 3/5 with the additional filters and switches. Thus, variations in the traffic distribution over time can be accommodated.

Another feature which provides flexibility in the event of changing traffic patterns is beam overlap. For instance, the states of Georgia and Florida can be covered by both the Atlantic and central beams. Thus, if traffic patterns were to change, one could increase or decrease the traffic in either beam by the assignment of CPTs in the overlap area to either the Atlantic or central areas.

Similar overlaps are provided between the mountain and central beams, particularly in the heavy traffic area of eastern Texas. A smaller overlap is provided between the Pacific and mountain beams. Overlap in the west is less effective because of the low traffic density in the western states.

For the second hop of the two-hop service, the uplink signals are received by one of the feeds and are routed to the receiver complex 605. From the receiver, the signals are then passed through a sixteen channel input multiplexer. Each channel is approximately 27 MHz wide. After channelization, each signal is routed through a TWTA and out to its appropriate output multiplexer 627. The number of channels associated with each output multiplexer 627 is nominally proportional to the percentage of traffic associated with the respective area of the CONUS.

In addition to the double-hop service, the repeater provides the capability for single-hop service in up to eight individually switchable CONUS transponders. These single-hop transponders may be used in this mode while the rest of the satellite is operated in the double-hop mode. Further, adequate switches have been provided after the receivers to operate the entire repeater in a single-hop mode. In this mode, sixteen transponders are provided over the area beams.

The channel filters of the output multiplexer 627 are mounted on a common manifold. The channel filters are four-section Chebychev directional filters which have a bandwidth of approximately 30 MHz and which provide 15 dB attenuation at the adjacent channel band center. This attenuation level is required to limit the adjacent channel interference associated with spectral lobe regrowth in the TWTA to an acceptable carrier-to-interference (C/I) level of 31 dB.

One factor in determining beam size and placement is the desirability of suitable locations for the RISEs. The beams to the RISEs can be orthogonally polarized to the CPT beams in the local area and spatially isolated from the beams of the same polarization covering another part of the country.

For instance, the eastern RISE can be located in the state of Maine. Since the area beam for the Atlantic area is vertically polarized, each beam to the eastern RISE is horizontally polarized to minimize interference. The eastern RISE beam is also sufficiently displaced in angle from the nearest horizontally polarized beam. In this case, that beam is the central beam and a 1.5° separation is provided so that adequate spatial isolation may be achieved.

Similarly, the western RISE beam is vertically polarized and is orthogonal to the polarization used in the Pacific CPT beam. It also has a 1.5° angular separation from the vertically polarized beam in the mountain area.

The frequency plan for the disclosed system is as follows. The 14 GHz (actually 14.0 to 14.5 GHz) CPT uplink signals are transmitted to each satellite in two broadband transponders U and L. The bandwidth of each transponder is 224 MHz and a 32 MHz guardband is provided between these two transponders. The first-hop downlink to the RISEs is performed at 12 GHz (actually 11.7 to 12.2 GHz) and is merely a frequency translation of the two broadband transponder composite signals. The CPTs can transmit in this first-hop arrangement with a frequency separation of 75 KHz. This arrangement permits up to 5,974 carriers.

On the second hop, either RISE can access any CPT by selection of an even-numbered or an odd-numbered transponder. This means that the CPTs preferably have a certain amount of frequency agility for the second-hop downlink. Namely, each CPT is required to receive in either an even-numbered or an odd-numbered channel. In summary, with this arrangement, any CPT can access either RISE and, in turn, either RISE can access any CPT. The two satellites operate with each other in a collocated fashion with each providing up to 4,000 CPT simultaneous accesses. In the event of an outage of the satellite or of a RISE, the system operates at half capacity (4,000 CPT accesses) until the outage is restored.

The second hop of the link accommodates the RISE transmission of the reformatted CPT signals. The RISE uplink is again at 14 GHz and uses the sixteen narrow band transponders provided for this second hop. The transponder frequency spacing is 30 MHz with each transponder having a usable bandwidth of 27 MHz, with 3 MHz separations.

Each satellite relays the RISE uplinks to the CPTs with this sixteen transponder arrangement on the downlink. The second-hop downlink frequency is at the same 12 GHz band as the first-hop downlink frequency. Since both uplinks and both downlinks involve the same frequency bands, frequency re-use is achieved with a combination of polarization isolation and spatial isolation. In the frequency plan, 20 MHz is reserved at the high end of the band to accommodate the command uplink as well as the telemetry beacon downlinks. Thus, each depicted satellite can accommodate 500 MHz of CPT uplink signals. These signals are then routed down to the RISEs. Satellite Se routes the lower 250 MHz to the eastern RISE Re and the upper 250 MHz to the western RISE. The western satellite Sw routes its downlink signals to the two RISEs in a complementary fashion. This particular feature allows any CPT to access either the eastern or western RISE by selecting the upper half or lower half of the 500 MHz spectrum.

Each RISE receives 250 MHz bandwidth of CPT signals from each satellite. Both RISEs demodulate the information and reformat it into sixteen uplink signals. The eastern RISE Re uses the eastern satellite Se for the second hop while the western RISE uses the western satellite Sw. Each satellite receives the second hop uplink signals, channelizes and amplifies these signals for retransmission back to the CPTs.

The choice of system parameters was strongly influenced by CPT hardware costs. On the first hop, the system requires transmission of 56 Kbps SCPC signals utilizing FDM. Using quadrature phase shift keyed (QPSK) modulation and rate $\frac{3}{4}$ soft decision decoding, the 56 Kbps data stream requires a 41 kHz bandwidth. The signals are spaced at 75 KHz intervals across both transponders which are dedicated to the first hop. Signal spacing could be tighter if required.

Energy/bit-to-noise ratios ($E_b/N_o$) of 8.9 and 7.5 dB are required to meet bit error rate levels of $1 \times 10^{-7}$ and $1 \times 10^{-5}$, respectively. The required signal-to-noise ratio is 1.5 dB higher than the $E_b/N_o$. Thus, 10.4 dB and 9.0 dB signal-to-noise ratios are required to meet bit error rate levels of $1 \times 10^{-7}$ and $1 \times 10^{-5}$, respectively.

The illustrated system transmits 15 Mbps time division multiplex (TDM) signals through each of the sixteen transponder channels on the second hop. Using differential binary phase shift keyed (DBPSK) modulation and rate ¾ coding, the 15 Mbps data stream requires 22 MHz of signal bandwidth. Satellite multiplexer requirements dictate a channel spacing of 30 MHz. Eb/No values of 9.6 and 7.8 correspond to bit error rates equal to $1 \times 10^{-7}$ and $1 \times 10^{-5}$, respectively. The required signal-to-noise ratio is 0.4 dB below the Eb/No.

The 500 MHz Ku-band (14.0 to 14.5 GHz for uplink, 11.7 to 12.2 GHz for downlink) is divided into two 224 MHz transponders for the first hop. At 75 KHz spacing, up to 2,987 56 Kbps channels may be simultaneously transmitted through each transponder although, due to an RF environment which includes video interference, a smaller number of channels may actually be available. In addition, the data rate capability of the second hop and multiple destination transmissions from CPTs further reduce the total number of channels required on the first hop.

The satellite repeater is capable of receiving the FDM signals from anywhere in CONUS for one satellite only operation or from either the Pacific and central beams or mountain and Atlantic beams for two satellite operation. The nominal gain over system noise temperature (G/T) for the CPT receive beams is 1.5 dB. Each transponder contains a TWTA operating at 10 dB backoff (5 watts). The backoff improves the linearity characteristics of the tube keeping the intermodulation products 25 dB below the carrier power. The satellite transmits to each RISE via spot beams which provide 17.7 dBw effective isotropic radiated power (EIRP) for each of the 5,974 possible channels.

The 500 MHz bandwidth is divided into 16 transponders at 30 MHz spacing for the second hop. The input and output filters allow 27 MHz of usable bandwidth. The satellite repeater is capable of receiving TDM signals from one RISE only or both RISEs simultaneously at 13.5 dB G/T. The signals are then transmitted to the CPTs at greater than 50 dBw EIRP.

A typical CPT for the illustrated system uses a 3 watt transmitter and antenna with a transmit gain of 42.8 dB. A typical 1.2 meter dish also receives a 41.1 dB gain and operates with a system receive noise temperature of 350° K. Adjacent satellite signals at 2° spacing are received 23 dB below the peak antenna gain. The output loss is 0.5 dB.

The RISE broadcasts each TDM channel at 50 watts, nearly balancing the flux density of the signals transmitted from the CPTs. This minimizes the cross-polarization interference between the RISE and CPTs in the same area. An eight meter antenna provides 37 dB discrimination from adjacent satellite interference and a transmit gain of 59.1 dB at Ku-band. The 34.3 dB/° K. antenna G/T consists of a 57.8 dB receive antenna gain and 225° K. system noise temperature. The output loss is 1.5 dB.

In accordance with the foregoing, a wide bandwidth two-hop satellite communications is provided. Many variations and modifications of the illustrated embodiment are readily apparent. Different numbers and locations of zones and areas could be selected. Other coding schemes could be used. Single, dual or multiple satellites could be employed. Different or additional frequency bands could be provided. Thus, the disclosed embodiments are merely illustrative of the present invention, as defined in the following claims.

What is claimed is:

1. A satellite communications system providing for communication among a plurality of ground stations within a region, said system comprising:
   collocated first and second satellite communications means, the first satellite communications means being capable of receiving signals from a first group of said plurality of ground stations, the second satellitte communications means being capable of receiving signals from a second group of said plurality of ground stations; and
   processor means for receiving and transforming a first set of signals from said first satellite communications means and relaying the first set of transformed signals to said second satellite communications means, and also for receiving and transforming a second set of signals from said second satellite communications means and relaying the second set of transformed signals to the first satellite communications means, said processor means being remote from said collocated satellite communications means, the second satellite communication means being capable of transmitting the transformed signals to the second group of the plurality of ground stations and the first satellite communications means being capable of transmitting the transformed signals to the first group of the plurality ground stations.

2. The system of claim 1 further characterized in that said collocated first and second satellite communications means are part of a single satellite.

3. The system of claim 1 further characterized in that said collocated first and second satellite communications means are parts of first and second satellites, respectively.

4. The system of claim 3 further characterized in that said collocated first and second satellites are in a geosynchronous orbit separated by no more than 1°.

5. The system of claim 3 further characterized in that said collocated first and second satellites are in a geosynchronous orbit separated by no more than 0.2°.

6. The system of claim 1 further characterized in that said processor means transforms a frequency division multiplexed signal into a time division multiplexed signal.

7. The system of claim 6 further characterized in that each satellite communications means includes a wideband transponder capable of transmitting frequency division multiplexed signals to said processor means and at least two narrow band transponders capable of receiving time division multiplexed signals from said processor means.

8. The system of claim 1 further characterized in that said processor means includes two processor stations which are spatially isolated from each other relative to said collocated satellite communications means.

9. The system of claim 1 further characterized in that said collocated first and second satellite communications means can define first and second zones within said region and in that said processor means includes a first processor station located outside said second zone.

10. The system of claim 9 further characterized in that said processor means includes a second processor station located outside said first zone.

11. The system of claim 10 further characterized in that said first processor station is located within said first zone and said second processor station is located within said second zone.

12. The system of claim 11 further characterized in that each processor station can transform frequency division multiplexed signals into time division multiplexed signals.

13. The system of claim 12 further characterized in that each satellite communications means includes first and second wide-band transponders capable of transmitting frequency division multiplexed signals to said first and second processor stations, respectively, and at least two narrow band transponders capable of receiving time division multiplexed signals from a respective of said processor stations.

14. The system of claim 11 further characterized in that each satellite communications means can deliver to each processor station an intended signal with a power flux density within an order of magnitude of the power flux density at the same said processor station attributable to a second-hop downlink.

15. The system of claim 11 further characterized in that each satellite communications means includes narrow beam forming means for transmitting to said processor station.

16. The system of claim 11 further characterized in that the ground stations located within said first zone can transmit at a first polarization and the ground stations located in said second zone can transmit at a second polarization orthogonal to the first polarization.

17. The system of claim 16 further characterized in that the ground stations located within said first zone can receive at said second polarization and the ground stations located in said second zone can receive at said first polarization.

18. In a satellite communications system, a method for providing communications between a first and second ground terminals within a region, the method comprising the steps of:
(a) allocating first and second satellite communications means,
(b) transmitting a signal from the first ground terminal to the first satellite communications means;
(c) relaying the signal from the first satellite communications means to a processing station; the processing station being located rmotely from the first and second communication means,
(d) transforming the signal at the processing station;
(e) relaying the transformed signal to the second satellite communications means; and
(f) transmitting the transformed signal to the second ground terminal.

19. A satellite communications system providing for communications among a plurality of ground terminals within a region, said system comprising:
collocated first and second satellite communications means, the first satellite communications means being capable of receiving signals from a first group of said group terminals and transmitting signals to a second group of said ground terminals;
said collocated first and second satellite communications means defining first and second zones within said region;
processor means for receiving and transforming a signal from said first satellite communications means and relaying the transformed signal to said second satellite communications means, said processor means being located remotely from said collocated satellite communications means, the processor means including a first processing station located in said first zone and a second processing station located in said second zone; and
the ground terminals being located within said first zone being capable of transmitting signals at a first polarization and the ground terminals located in the second zone being capable of transmitting signals at second polarization that is orthogonal to the first polarization.

20. A satellite communications system providing for communicationg among ground terminals within a region, said system comprising:
collocated first and second satellite communications means, each of the satellite communications means being capable of receiving signals from some of said ground stations and transmitting signals to some of said ground stations;
said colocated first and second satellite communications means defining first and second zones within said region;
processor means for receiving and transforming a signal from said first satellite communications means and relaying the transformed signals to said second communications means, the processor means being located remotely from said collocated satellite communications means, the processor means including a first processing station located in said first zone and a second processing station located in said second zone;
the ground terminals located within said first zone being capable of transmitting at a first polarization and receiving at a second polarization that is orthogonal to the first polarization and the ground terminals located in the second zone being capable of transmitting at the second polarization and receiving at the first polarization.

21. A system for providing communications among ground terminals within a region, the system comprising;
a first ground terminal, first and second collocated satellite communications means;
means for transmitting a signal from the first ground terminal to the first satellite communications means; and
a processor means for receiving the signal from the first satellite communications means and for transforming the signal, the processing means also for relaying the transformed signal to the second satellite communication means, the processor means being located remotely from the collocated satellite communication means, and
a second ground terminal for receiving the transformed signal from the second satellite communications means.

* * * * *

UNITED STATES PATENT AND TRADEMARK OFFICE
CERTIFICATE OF CORRECTION

PATENT NO. : 4,752,925

DATED : June 21, 1988

INVENTOR(S) : J. D. THOMPSON et al.

Figure 5:
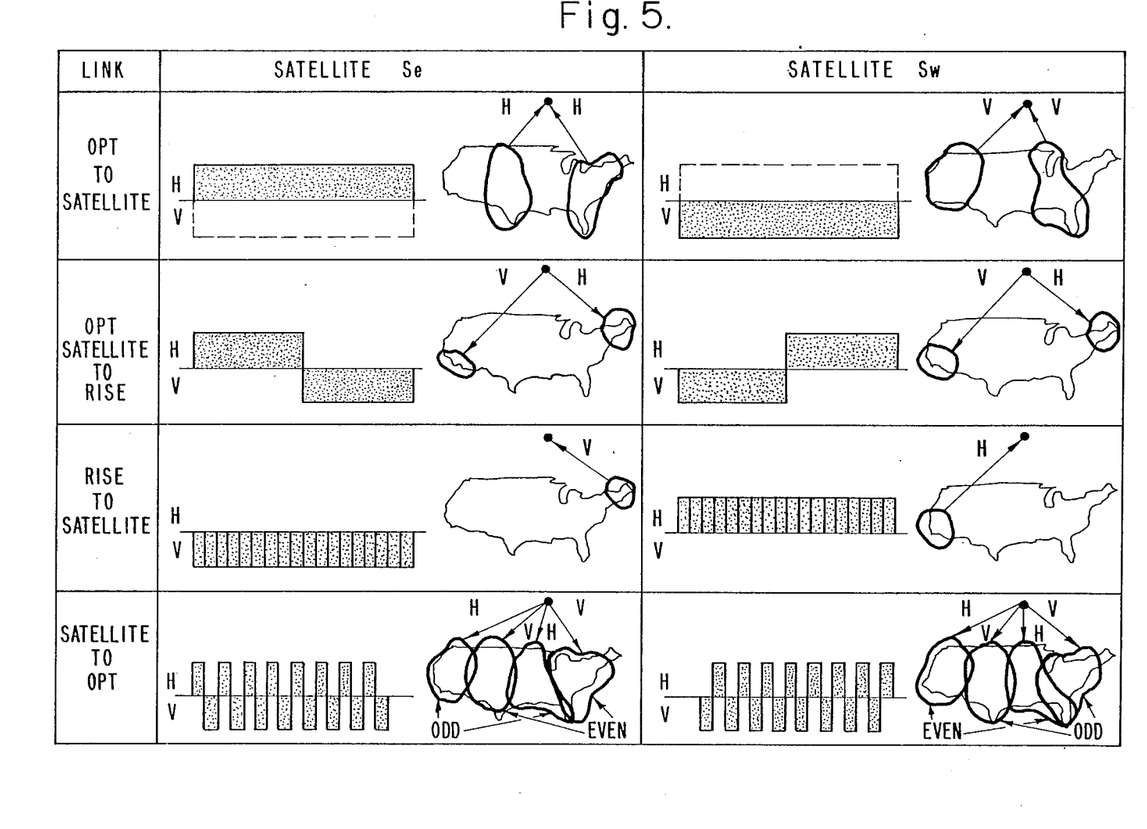
FIG. 5 summarizes FIGS. 1a through 4b.

It is certified that error appears in the above—identified patent and that said Letters Patent is hereby corrected as shown below:

Figures 5 and 6 should be deleted and substitute the attached Figures 5 and 6 therefor.

Signed and Sealed this

Twenty-sixth Day of December, 1989

*Attest:*

JEFFREY M. SAMUELS

*Attesting Officer*     *Acting Commissioner of Patents and Trademarks*

Fig. 5.

Fig. 6.